(12) United States Patent
Schaeffer et al.

(10) Patent No.: US 12,523,163 B2
(45) Date of Patent: Jan. 13, 2026

(54) THERMAL PROTECTION METHODS USING BARRIER COATINGS WITH STRAIN TOLERANCE GROOVES

(71) Applicant: GE Infrastructure Technology LLC, Greenville, SC (US)

(72) Inventors: Jon C. Schaeffer, Greenville, SC (US); Srikanth C. Kottilingam, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 157 days.

(21) Appl. No.: 18/449,768

(22) Filed: Aug. 15, 2023

(65) Prior Publication Data

US 2025/0059895 A1    Feb. 20, 2025

(51) Int. Cl.
*F01D 25/00* (2006.01)
*C09D 5/18* (2006.01)
*C23C 28/00* (2006.01)

(52) U.S. Cl.
CPC ............. *F01D 25/005* (2013.01); *C09D 5/18* (2013.01); *C23C 28/30* (2013.01); *F05D 2230/90* (2013.01); *F05D 2300/611* (2013.01)

(58) Field of Classification Search
None
See application file for complete search history.

(56) References Cited

U.S. PATENT DOCUMENTS

| | | | |
|---|---|---|---|
| 5,419,971 A | 5/1995 | Skelly | |
| 5,558,922 A | 9/1996 | Gupta | |
| 6,074,706 A | 6/2000 | Beverley | |
| 6,379,754 B1 | 4/2002 | Schlegel | |
| 6,461,107 B1 | 10/2002 | Lee | |
| 6,471,881 B1 | 10/2002 | Chai | |
| 8,430,077 B2 | 4/2013 | Konrad | |
| 9,939,364 B2 | 4/2018 | Zhou | |
| 9,995,393 B2 | 6/2018 | Meirelles Tomanik | |
| 10,196,920 B2 | 2/2019 | Subramanian | |

(Continued)

FOREIGN PATENT DOCUMENTS

EP    3455393 B1    1/2023

OTHER PUBLICATIONS

Extended European Search Report Received for EP24189967 on Dec. 10, 2024; 9 pps.

*Primary Examiner* — Michael P. Rodriguez
(74) *Attorney, Agent, or Firm* — Armstrong Teasdale LLP (57) ABSTRACT

A method of forming a component. The method includes applying a thermal barrier coating to the component to facilitate decreasing heat transfer to the component, wherein the thermal barrier coating includes at least one thermal insulating layer and a metallic bond coat layer in contact with an outer surface of the component. The method also includes forming a plurality of grooves in the at least one thermal insulating layer of the thermal barrier coating to facilitate increasing a strain tolerance of the thermal barrier coating, wherein each of the plurality of grooves extends a depth into the at least one thermal insulating layer. The method further includes depositing a material within the plurality of grooves to facilitate increasing an amount of thermal protection of the metallic bond coat layer within those areas of the thermal barrier coating in which the plurality of grooves are formed.

19 Claims, 7 Drawing Sheets

(56) References Cited

U.S. PATENT DOCUMENTS

| | | |
|---|---|---|
| 10,352,269 B2 | 7/2019 | Ikai |
| 10,526,996 B2 | 1/2020 | Yang |
| 2005/0158590 A1 | 7/2005 | Li |
| 2008/0085191 A1 | 4/2008 | Liang |
| 2009/0017260 A1* | 1/2009 | Kulkarni ............ C23C 28/3455 |
| | | 428/161 |
| 2018/0066527 A1 | 3/2018 | Kadau et al. |
| 2019/0284673 A1* | 9/2019 | Landwehr ............ C23C 28/347 |
| 2022/0333494 A1 | 10/2022 | Subramanian |

* cited by examiner

THERMAL PROTECTION METHODS USING BARRIER COATINGS WITH STRAIN TOLERANCE GROOVES

BACKGROUND

The present disclosure relates generally to thermal protection coatings for use with turbine engine components, and, more specifically, to methods for depositing material into strain tolerance grooves of a thermal barrier coating applied to turbine engine components.

Turbine engines, such as gas turbine engines and/or steam turbine engines, are widely used in industrial and power generation operations. Known turbine engines are subjected to prolonged high temperatures, which over time may lead to deformation of the components of the turbine engines. To protect the components from the heat, at least some known turbine engine components include a thermal barrier coating. Typically, the thermal barrier coating on a turbine engine component includes one or more thermal insulating layers, as well as a metallic bond coat layer that extends directly across the base metal of the component.

To facilitate improving the strain tolerance of the coating, at least some known thermal barrier coatings are formed with strain tolerance grooves that extend across the turbine engine component. However, the presence of such grooves may result in a decreased thermal barrier coating thickness at the locations of each formed groove on the turbine engine component. Thus, oxidation and degradation of the metallic bond coat layer may be more likely to occur within or proximate to the strain tolerance grooves when exposed to the high operation temperatures at these locations. Accordingly, there exists a need for methods to deposit additional material into strain tolerance grooves of a thermal barrier coating to facilitate improving the overall thermal protection of the turbine engine components.

BRIEF DESCRIPTION

In one aspect, a method of forming a component is provided. The method includes applying a thermal barrier coating to the component to facilitate decreasing heat transfer to the component, wherein the thermal barrier coating includes at least one thermal insulating layer and a metallic bond coat layer, wherein the at least one thermal insulating layer extends across the metallic bond coat layer and wherein the metallic bond coat layer is in contact with an outer surface of the component. The method also includes forming a plurality of grooves in the at least one thermal insulating layer of the thermal barrier coating to facilitate increasing a strain tolerance of the thermal barrier coating, wherein each of the plurality of grooves extends a depth into the at least one thermal insulating layer. The method further includes depositing a material within the plurality of grooves to facilitate increasing an amount of thermal protection of the metallic bond coat layer within those areas of the thermal barrier coating in which the plurality of grooves are formed.

In another aspect, a method of fabricating a turbine engine component is provided. The method includes applying a thermal barrier coating to the component to facilitate decreasing heat transfer to the component, wherein the thermal barrier coating includes at least one thermal insulating layer and a metallic bond coat layer, wherein the at least one thermal insulating layer extends across the metallic bond coat layer and wherein the metallic bond coat layer is in contact with an outer surface of the component. The method also includes forming a plurality of grooves in the at least one thermal insulating layer of the applied thermal barrier coating to facilitate increasing a strain tolerance of the thermal barrier coating, wherein each of the plurality of grooves extends into a depth into the at least one thermal insulating layer to a groove bottom along a line perpendicular to the metallic bond coat layer. The method further includes depositing a material within the plurality of grooves to facilitate increasing an amount of thermal protection of the metallic bond coat layer that is proximate to the line of extension of each of the plurality of grooves.

DETAILED DESCRIPTION

The embodiments described herein relate to methods for use in depositing material into strain tolerance grooves of a thermal barrier coating to facilitate improving the thermal protection of the turbine engine components.

The methods described herein facilitate the thermal protection of turbine engine components. The advantages of the methods described herein include, at least: (i) improved thermal protection of a turbine engine component due to a thermal barrier coating protecting the component from heat damage; (ii) improved strain tolerance of the thermal barrier coating on the turbine engine component due to the grooves in the thermal barrier coating; and (iii) improved thermal protection of the turbine engine component due to the material deposited into the strain tolerance grooves of the thermal barrier coating to reduce the oxidation and degradation of a metallic bond coat layer of the thermal barrier coating proximate the strain tolerance grooves.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
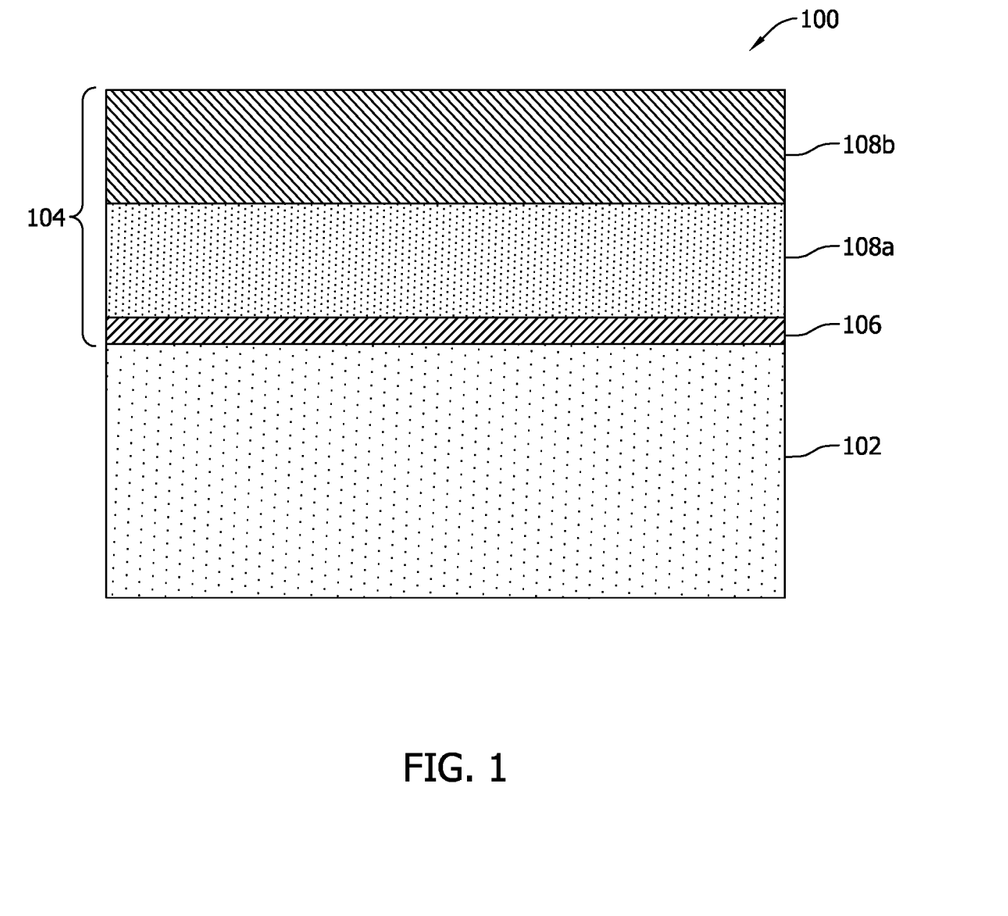
FIG. 1 is a schematic illustration of an exemplary turbine engine component including a thermal barrier coating.

FIG. 1 is a schematic illustration of an exemplary turbine engine component 100. The component 100 may be any of a variety of component types used in a variety of turbine engine applications, such as, for example, components utilized in high temperature applications. In some embodiments, the component 100 may be a turbine blade, compressor blade, vane, nozzle, shroud, rotor, transition piece, and/or rotor casing. In other embodiments, the component 100 may be any other component of a turbine engine. In the exemplary embodiment, the component 100 includes a base metal 102 and a thermal barrier coating 104. The thermal barrier coating 104 may facilitate improving the thermal protection of the base metal 102 from exposure to high temperatures during use.

In the exemplary embodiment, the thermal barrier coating 104 includes a metallic bond coat layer 106 that contacts the base metal 102. The thermal barrier coating 104 may also include a plurality of thermal insulating layers 108. For example, in the illustrated embodiment, the thermal barrier coating 104 includes a first thermal insulating layer 108a and a second thermal insulating layer 108b. In some embodiments, the thermal barrier coating 104 may include more or less than two thermal insulating layers 108.

Generally, the thermal barrier coating 104 may include any material known in the art that facilitates the methods of thermal protection described herein. For example, the first thermal insulating layer 108 and/or the second thermal insulating layer 108b may include one or more materials having one or more material properties that facilitate thermal protection of the metallic bond coat layer 106 of the thermal barrier coating 104 from the high operating temperatures of the component 100. In the exemplary embodiment, the one or more materials included in the first thermal insulating layer 108 and/or the second thermal insulating layer 108b have the material property of a chemical composition.

Generally, the chemical composition of the one or more materials included in the first thermal insulating layer 108 and/or the second thermal insulating layer 108b may include any chemical composition properties that facilitate the methods of thermal protection described herein. For example, adjustments of geometry (e.g., an element geometry and/or a composition geometry), a length, and/or a ratio (e.g., a molar ratio, a weight ratio, and/or a volume ratio) can adjust the size, shape, and properties of the one or more materials included in the first thermal insulating layer 108 and/or the second thermal insulating layer 108b. In some embodiments, the chemical composition may vary across the thermal insulating layers 108. For example, the chemical composition of the first thermal insulating layer 108 may differ from the chemical composition of the second thermal insulating layer 108b. In other embodiments, the chemical composition may be substantially the same for all thermal insulating layers 108. For example, the chemical composition of the first thermal insulating layer 108 may be substantially the same as the chemical composition of the second thermal insulating layer 108b.

Figure 2:
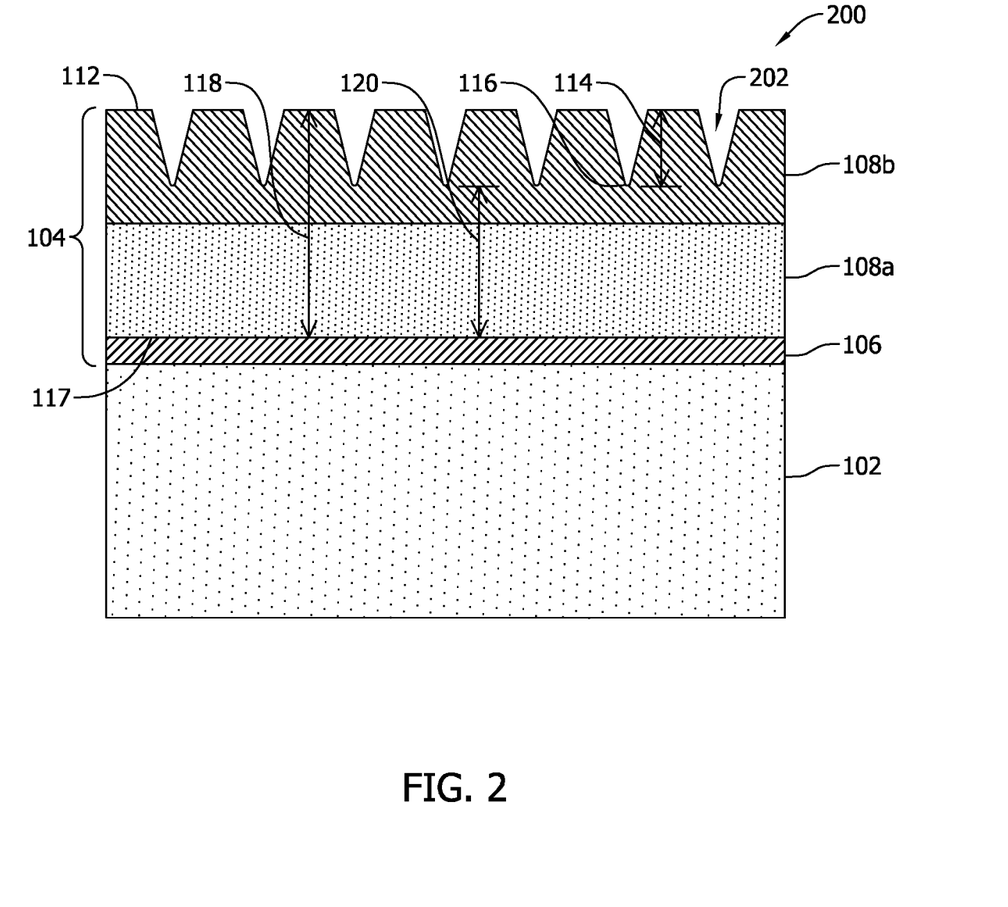
FIG. 2 is a schematic illustration of an exemplary turbine engine component, including a thermal barrier coating formed with a plurality of strain tolerance grooves in a first layer of the thermal barrier coating.

FIG. 2 is a schematic illustration of an exemplary turbine engine component 200. The component 200 illustrated in FIG. 2 is similar to the component 100 (shown in FIG. 1), with the differences noted below, and as such, the same reference numbers are used to identify the same component in FIG. 2 as were used in FIG. 1. The high temperatures in which the component 200 is used may strain the structure of the thermal barrier coating 104. As such, as is known in the art, the thermal barrier coating 104 may include vertical microcracks to facilitate increasing the strain tolerance of the thermal barrier coating 104. In the exemplary embodiment, the thermal barrier coating 104 includes a plurality of grooves 202 that facilitate improving strain tolerance of the thermal barrier coating 104.

In the exemplary embodiment, the grooves 202 extend from an upper surface 112 of the thermal barrier coating 104 inwardly towards the base metal 102 of the component 200, such that a depth 114 of each of the grooves 202 extends to a bottom 116 of the grooves 202 defined within the second thermal insulating layer 108b of the thermal barrier coating 104. Although seven grooves 202 are illustrated in FIGS. 2-7, the thermal barrier coating 104 may include more or less than seven grooves 202, and as such, the illustration of a specific number of grooves 202 is not intended to be limiting. In addition, although depicted as the grooves 202 each having approximately the same depth 114, in alternative embodiments, at least one groove 202 may be formed with a different depth 114 than at least one other groove 202. Furthermore, although grooves 202 are depicted as being substantially equi-spaced across component 200 and are substantially parallel to each other, in alternative embodiments, grooves 202 may be spaced in any orientation and/or may be aligned in any direction relative to each other that enables grooves 202 to facilitate improving the strain tolerance of thermal barrier coating 104.

In the exemplary embodiment, the shape of the grooves 202 is blunted or rounded at the bottom 116 to facilitate reducing cracking of the thermal barrier coating 104. For example, the bottom 116 of each groove 202 may be formed with a radius or be semi-elliptical. In other embodiments, grooves 202 may have any other shape, such as being generally triangular-shaped, that enables grooves 202 to facilitate improving the strain tolerance of thermal barrier coating 104 without increasing the likelihood of cracking forming.

Figure 3:
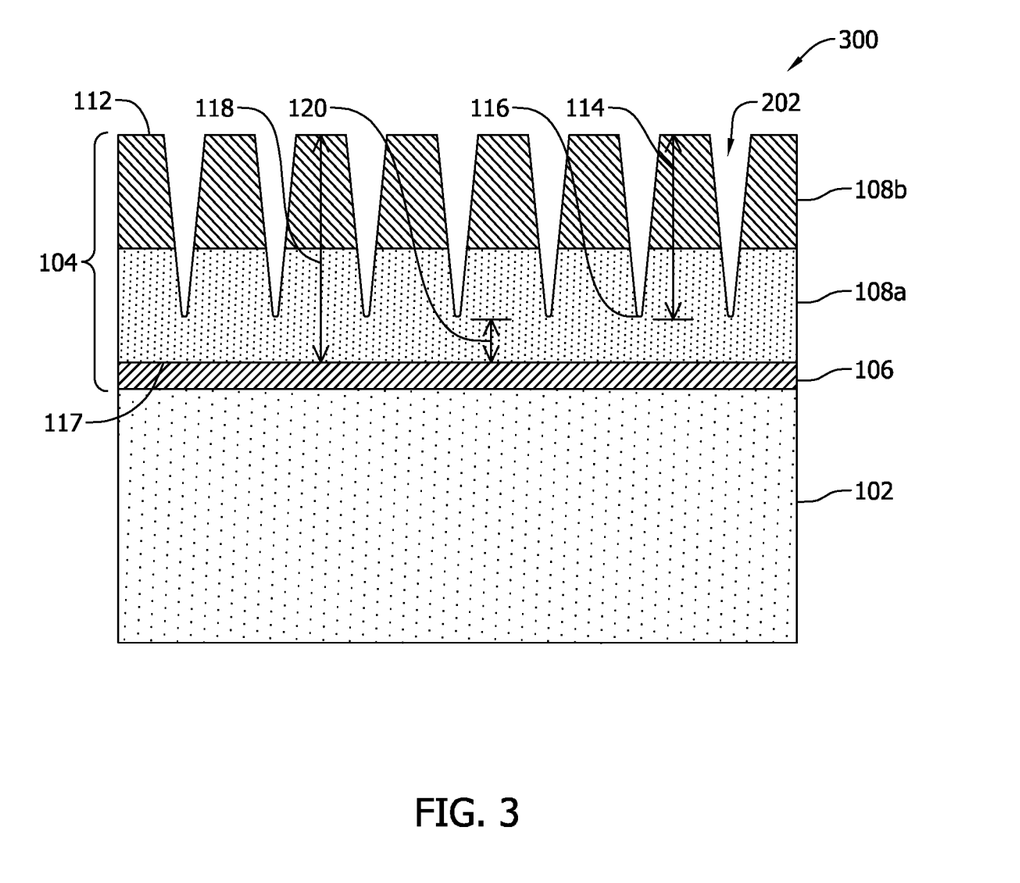
FIG. 3 is a schematic illustration of an exemplary turbine engine component, including a thermal barrier coating formed with a plurality of strain tolerance grooves in the first layer and a second layer of the thermal barrier coating.

FIG. 3 is a schematic illustration of an exemplary turbine engine component 300. The component 300 illustrated in FIG. 3 is similar to the component 100 (shown in FIG. 1) and the component 200 (shown in FIG. 2), with the differences noted below, and as such, the same reference numbers are used in FIG. 3 to identify the same components as were used in FIGS. 1 and 2. The thermal barrier coating 104 includes the plurality of grooves 202 to facilitate improved strain tolerance of the thermal barrier coating 104. More specifically, in the exemplary embodiment, each groove 202 extends from the upper surface 112 of the thermal barrier coating 104 inwardly towards the base metal 102 of the component 300, such that the depth 114 of each groove 202 is defined at its bottom 116 within the second thermal insulating layer 108b of the thermal barrier coating 104. Accordingly, the depth 114 of each groove 202 illustrated in FIG. 3 is deeper than the depth 114 of each groove 202 illustrated in FIG. 2.

Figure 4:
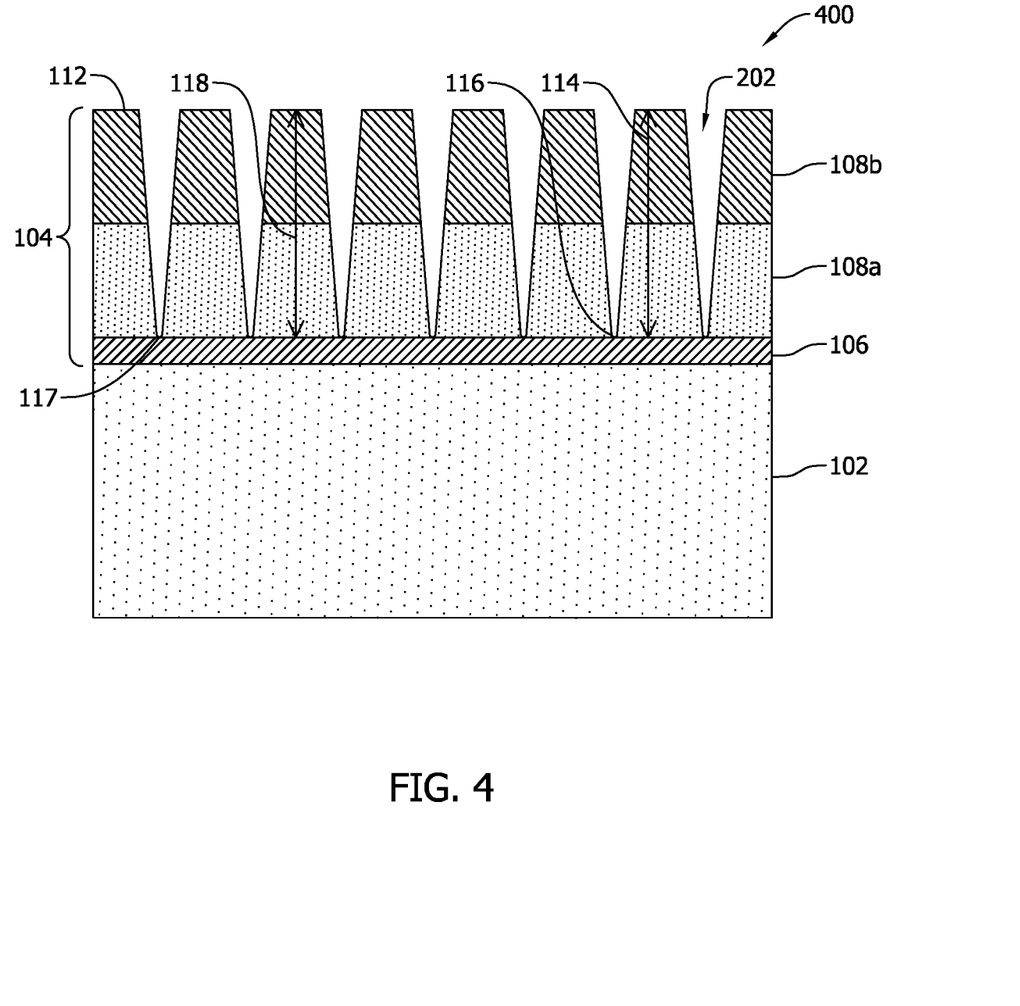
FIG. 4 is a schematic illustration of an exemplary turbine engine component, including a thermal barrier coating formed with a plurality of strain tolerance grooves in the first and second layers of the thermal barrier coating and in contact with a metallic bond coat layer of the thermal barrier coating.

FIG. 4 is a schematic illustration of an exemplary turbine engine component 400. The component 400 illustrated in FIG. 4 is similar to the component 100 (shown in FIG. 1), the component 200 (shown in FIG. 2), and the component 300 (shown in FIG. 3), with the differences noted below, and as such, the same reference numbers are used in FIG. 4 to identify the same components as were used in FIGS. 1-3. The thermal barrier coating 104 includes the plurality of grooves 202 to facilitate improved strain tolerance of the thermal barrier coating 104. More specifically, in the exemplary embodiment, each groove 202 extends from the upper surface 112 of the thermal barrier coating 104 inwardly towards the base metal 102 of the component 300, such that the depth 114 of each groove 202 is defined at its bottom 116 at a junction 117 between the first thermal insulating layer 108 and the metallic bond coat layer 106. Accordingly, the depth 114 of each groove 202 illustrated in FIG. 4 is deeper than the depth 114 of each groove 202 illustrated in FIGS. 2 and 3.

In the exemplary embodiment, a thickness 118 of the thermal barrier coating 104 is defined by the combined thicknesses of all of the individual thermal insulating layers 108 (e.g., the first thermal insulating layer 108a and the second thermal insulating layer 108b) as measured from the upper surface 112 of the thermal barrier coating 104 to the junction 117 defined between the first thermal insulating layer 108 and the metallic bond coat layer 106. For example, in the illustrated embodiments of FIGS. 2-4, the thickness 118 of the thermal barrier coating is defined as the combined thicknesses of the first thermal insulating layer 108 and the second thermal insulating layer 108b.

In the exemplary embodiment, each of the groove bottoms 116 is defined an intermediate distance 120 from the junction 117 defined between the first thermal insulating layer 108 and the metallic bond coat layer 106. As seen in FIGS. 2-4, the intermediate thickness 120 is smaller than the overall thickness 118 of the thermal barrier coating 104. Thus, at the bottoms 116 of the grooves 202, the thermal barrier coating 104 provides less thermal protection between the high environmental operating temperatures of the component (e.g., the components 200, 300, 400) and the metallic bond coat layer 106. Without the present invention, the increased proximity to the high operation temperatures (e.g., because the metallic bond coat layer 106 has less thermal barrier coating 104 extending across it at each groove bottom 116), the likelihood of oxidation and/or degradation of the metallic bond coat layer 106 at such locations, relative to the thermal barrier coating 104, is increased.

Figure 5A:
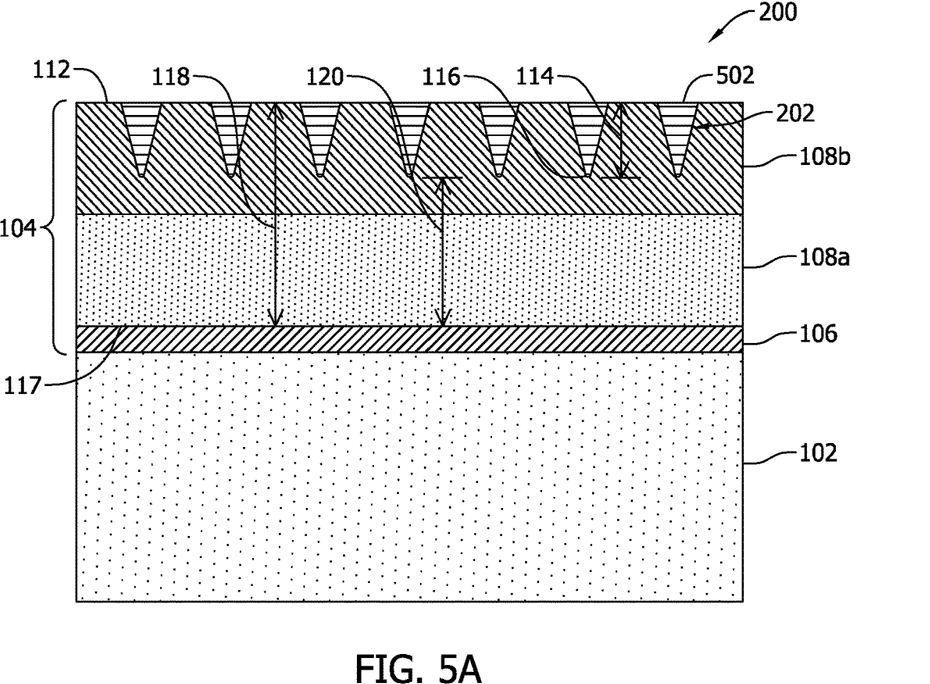
FIGS. 5A and 5B are schematic illustrations of the turbine engine component of FIG. 2, including a material deposited into the plurality of strain tolerance grooves.
Figure 5B:
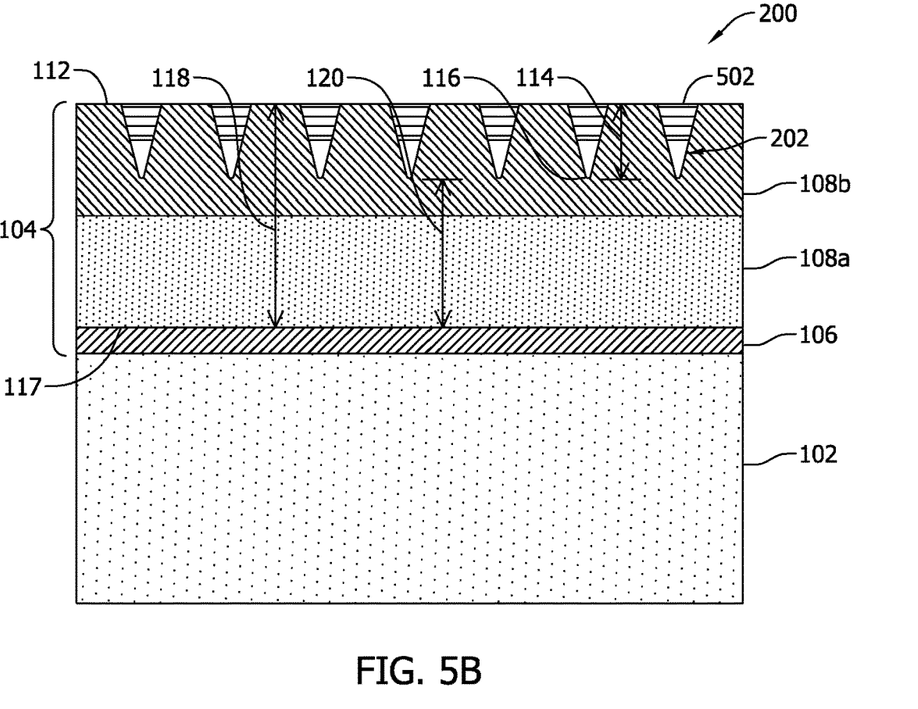
Figure 6A:
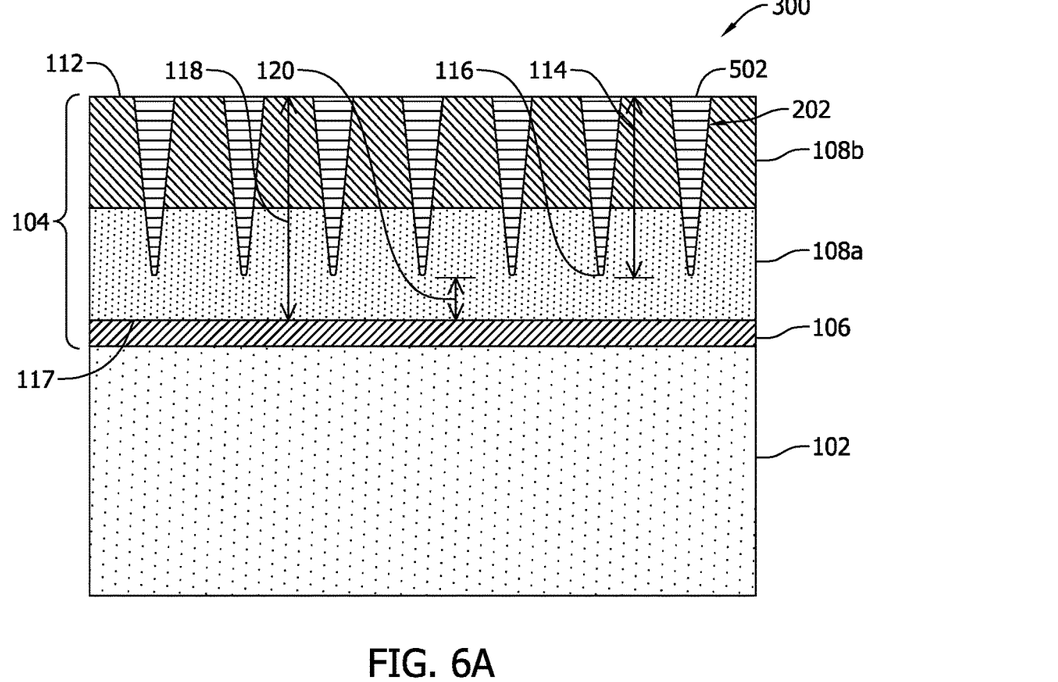
FIGS. 6A and 6B are schematic illustrations of the turbine engine component of FIG. 3, including a material deposited into the plurality of strain tolerance grooves.
Figure 6B:
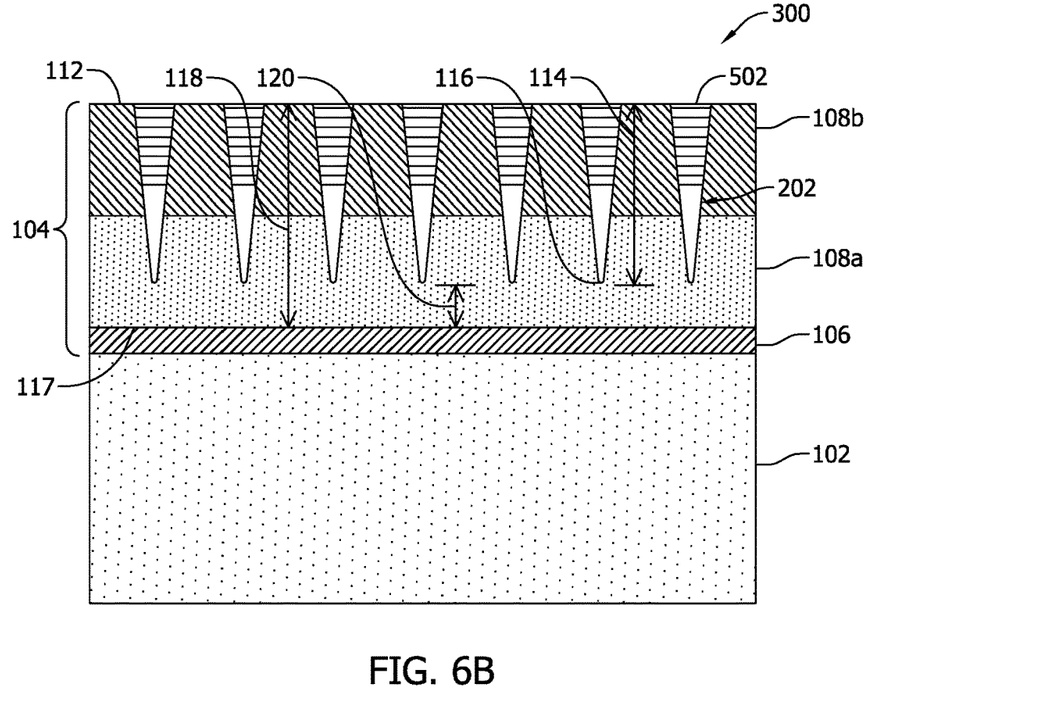
Figure 7A:
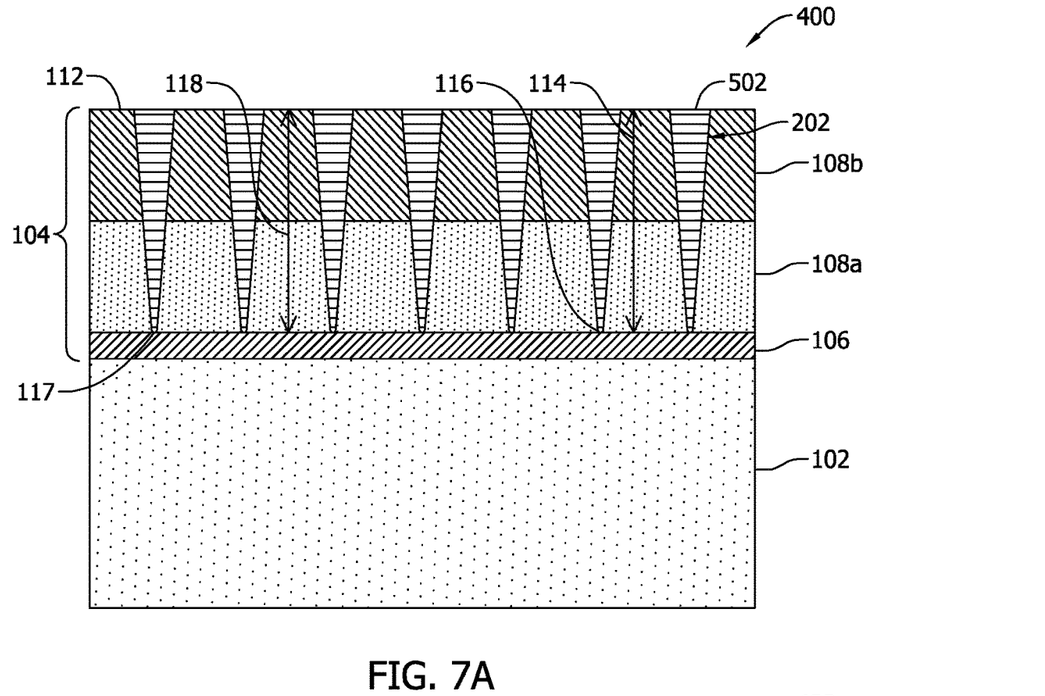
FIGS. 7A and 7B are schematic illustrations of the turbine engine component of FIG. 4, including a material deposited into the plurality of strain tolerance grooves.
Figure 7B:
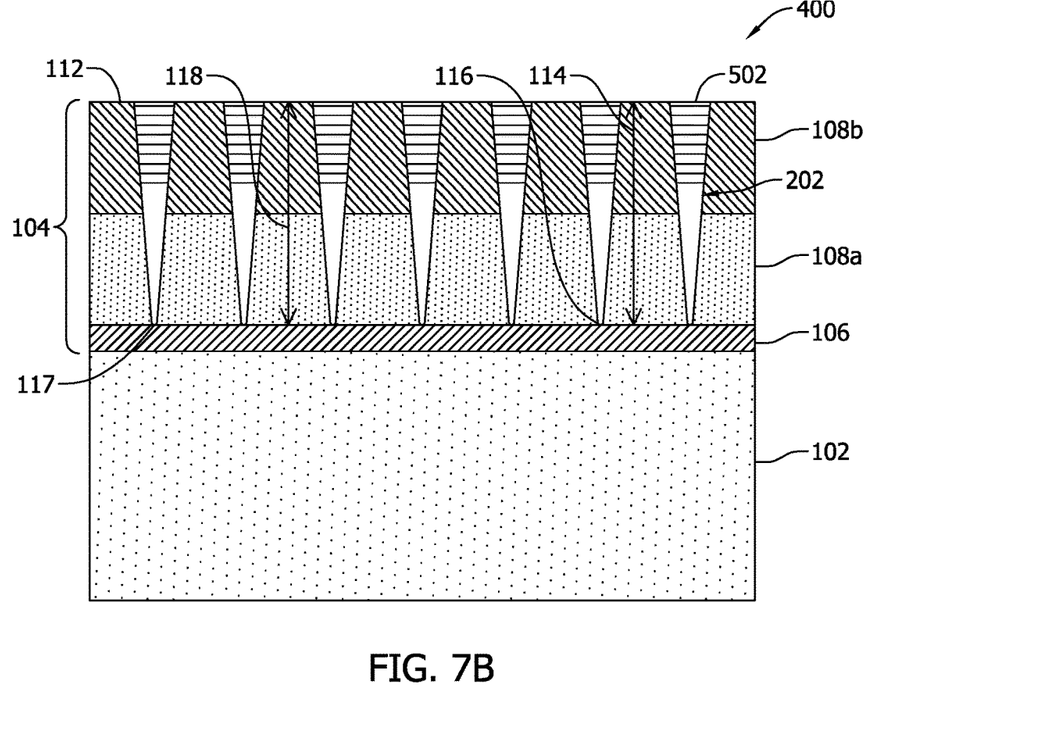

FIGS. 5-7 are schematic illustrations of the turbine engine components (e.g., the components 200, 300, 400) including an insulating filler material 502 deposited within at least one of the plurality of grooves 202 of the thermal barrier coating 104. In the exemplary embodiment, the insulating filler material 502 enhances the thermal protection provided at relative locations across the thermal barrier coating 104 in which less thermal barrier coating 104 extends across the metallic bond coat layer 106 (e.g., locations such as the bottom 116 of each groove 202).

Generally, the insulating filler material 502 may be any material known in the art that facilitates enhancing thermal protection of the components as described herein. For example, the insulating filler material 502 may have one or more material properties that facilitates enhancing thermal protection of the base metal 102 of the component (e.g., the components 200, 300, 400) and the metallic bond coat layer 106 from the high environmental operating temperatures that each component may be exposed to.

In the exemplary embodiment, the insulating filler material 502 is variably selected to have intrinsic material properties of a desired chemical composition and porosity. For example, the material selected may be chosen to have chemical composition properties that facilitate a desired level of thermal protection described herein. For example, adjustments of geometry (e.g., an element geometry and/or a composition geometry), length, and/or ratio (e.g., a molar ratio, a weight ratio, and/or a volume ratio) can enable the size, shape, and properties of the insulating filler material 502 to be variably selected and adjusted.

Additionally, generally, the insulating filler material 502 may be selected to include any porosity properties that facilitate the methods of thermal protection described herein. For example, the material can be variably selected to include desired particle density, particle size distribution, and/or particle shape properties.

FIGS. 5A and 5B are schematic illustrations of the component 200, wherein the insulating filler material 502 substantially fills (shown in FIG. 5A) and partially fills (shown in FIG. 5B) each of the grooves 202. FIGS. 6A and 6B are schematic illustrations of the component 300, wherein the insulating filler material 502 substantially fills (shown in FIG. 6A) and partially fills (shown in FIG. 6B) each of the grooves 202. FIGS. 7A and 7B are schematic illustrations of the component 400, wherein the insulating filler material 502 substantially fills (shown in FIG. 7A) and partially fills (shown in FIG. 7B) each of the grooves 202. The grooves 202 may include any amount of insulating filler material 502, such that at least some grooves 202 may remain empty while other grooves 202 are completely filled with the insulating filler material 502. As such, the amount of insulating filler material 502 inserted within the grooves 202 is not intended to be limited by the amounts shown in FIGS. 5-7.

Additionally, the amount of insulating filler material inserted into the grooves 202 may not be uniform across the component (e.g., component 200, 300, 400). As such, although FIGS. 5-7 illustrate a substantially uniform amount of insulating filler material 502 inserted within the grooves 202, the illustrations are exemplary only and are not intended to be limiting with respect to the amount and/or the displacement of insulating filler material 502 inserted within the grooves 202. Generally, the amount of insulating filler material 502 each groove 202 receives is based on the type, size, and/or shape of the component (e.g., component 200, 300, 400), for example. More specifically, certain types of components and/or specific areas of a component may be more severely impacted by the high operation temperatures, or exposed to higher environmental operating temperatures than other areas of the component. Thus, within such components, the grooves 202 may receive an increased amount of insulating filler material 502 as compared to other types and/or areas of the same component.

In the exemplary embodiment, the amount (e.g., depth) of the insulating filler material 502 deposited in the grooves 202 may also depend on the application process used for depositing the insulating filler material 502. For example, in some embodiments, the insulating filler material 502 may be deposited in the grooves 202 as a slurry or sprayed across the component (e.g., component 200, 300, 400). In one embodiment, the insulating filler material 502 may be a yttria-based material applied in the form of slurry. In some embodiments, the insulating filler material 502 may be an oxide-based mixture or slurry, such as, but not limited to, a zirconia-based mixture or slurry. In other embodiments, the insulating filler material 502 may be a zirconia-based mixture or slurry that may also include silicon, aluminum, and/or rare earths.

The amount of the insulating filler material 502 in the grooves 202 may also be controlled by the type of and/or amount of application of the insulating filler material 502. For example, to increase the amount of insulating filler material 502 (e.g., to increase a depth of the insulating filler material 502 deposited in the grooves 202), multiple passes of a spray application may be performed. In some embodiments, a heat treatment may be applied to the component (e.g., component 200, 300, 400) after the insulating filler material 502 is deposited within the grooves 202. In other embodiments, a reactive sintering process may occur as the insulating filler material 502 is applied to the component (e.g., component 200, 300, 400).

The amount of the insulating filler material 502 in the grooves 202 may also be controlled by the type of mixture of the insulating filler material 502. For example, the mixture of the insulating filler material 502 may be varied based on the powder size of the mixture to facilitate improving the fill of the grooves 202 by the insulating filler material 502. The powder size of the mixture may be increased or decreased to enable improved filling along the length of the grooves 202, facilitating an improved depth of thermal protection (e.g., both oxidation protection and heat protection) that is provided through the thickness of the coating in the grooves 202.

Exemplary methods for depositing insulating filler material into strain tolerance grooves of a thermal barrier coating to improve the thermal protection of the turbine engine components are described herein. The exemplary systems and methods as described herein provide several advantages over conventional designs and processes, including improved thermal protection of a turbine engine component, improved strain tolerance of the thermal barrier coating extending across the turbine engine component, and extending the useful life of the turbine engine component by facilitating the reduction of the effects of prolonged exposure to high operating temperatures, including a reduction in the oxidation and degradation of the turbine component at the locations of the strain tolerance grooves formed within the thermal barrier coating.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems and methods described herein are not limited to the specific embodiments described herein, but rather portions of the various systems may be utilized independently and separately from other systems and methods described herein.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

Further aspects of the invention are provided by the subject matter of the following clauses:

A method of forming a component, the method comprising: applying a thermal barrier coating to the component to facilitate decreasing heat transfer to the component, wherein the thermal barrier coating comprises at least one thermal insulating layer and a metallic bond coat layer, wherein the at least one thermal insulating layer extends across the metallic bond coat layer and wherein the metallic bond coat layer is in contact with an outer surface of the component; forming a plurality of grooves in the at least one thermal insulating layer of the thermal barrier coating to facilitate increasing a strain tolerance of the thermal barrier coating, wherein each of the plurality of grooves extends a depth into the at least one thermal insulating layer; and depositing a material within the plurality of grooves to facilitate increasing an amount of thermal protection of the metallic bond coat layer within those areas of the thermal barrier coating in which the plurality of grooves are formed.

The method in accordance with any of the preceding clauses, wherein depositing the material within the plurality of grooves comprises depositing the material in a slurry form.

The method in accordance with any of the preceding clauses, wherein depositing the material within the plurality of grooves comprises depositing the material in a spray form.

The method in accordance with any of the preceding clauses, wherein applying the thermal barrier coating to the component comprises applying a first thermal insulating layer across the component and a second thermal insulating layer across at least a portion of the first thermal insulating layer.

The method in accordance with any of the preceding clauses, wherein forming the plurality of grooves comprises forming the plurality of grooves such that at least some of the grooves extend into the second thermal insulating layer.

The method in accordance with any of the preceding clauses, wherein forming the plurality of grooves comprises forming the plurality of grooves such that at least some of the grooves extend through the second thermal insulating layer and at least partially into the first thermal insulating layer.

The method in accordance with any of the preceding clauses, wherein forming the plurality of grooves comprises forming the plurality of grooves such that at least some of the grooves extend through the second and first thermal insulating layers to contact the metallic bond coat layer.

The method in accordance with any of the preceding clauses, wherein depositing the material within the plurality of grooves further comprises depositing the material within the plurality of grooves to facilitate decreasing an amount of degradation of the component within those areas of the thermal barrier coating including the plurality of grooves.

The method in accordance with any of the preceding clauses, wherein depositing the material within the plurality of grooves further comprises depositing the material to fill an entirety of each of the plurality of grooves.

The method in accordance with any of the preceding clauses, wherein depositing the material within the plurality of grooves further comprises depositing the material to fill only a portion of the plurality of grooves.

The method in accordance with any of the preceding clauses, wherein depositing the material within the plurality of grooves further comprises depositing the material within the plurality of grooves to facilitate decreasing an amount of oxidation of the component within those areas of the thermal barrier coating including the plurality of grooves.

The method in accordance with any of the preceding clauses, wherein forming the plurality of grooves comprises forming each groove with a bottom surface that is defined by a radius.

A method of fabricating a turbine engine component, the method comprising: applying a thermal barrier coating to the component to facilitate decreasing heat transfer to the component, wherein the thermal barrier coating comprises at least one thermal insulating layer and a metallic bond coat layer, wherein the at least one thermal insulating layer extends across the metallic bond coat layer and wherein the metallic bond coat layer is in contact with an outer surface of the component; forming a plurality of grooves in the at least one thermal insulating layer of the applied thermal barrier coating to facilitate increasing a strain tolerance of the thermal barrier coating, wherein each of the plurality of grooves extends into a depth into the at least one thermal insulating layer to a groove bottom along a line perpendicular to the metallic bond coat layer; and depositing a material within the plurality of grooves to facilitate increasing an amount of thermal protection of the metallic bond coat layer that is proximate to the line of extension of each of the plurality of grooves.

The method in accordance with any of the preceding clauses, wherein applying the thermal barrier coating to the component comprises applying a first thermal insulating layer across the component and a second thermal insulating layer across at least a portion of the first thermal insulating layer.

The method in accordance with any of the preceding clauses, wherein forming the plurality of grooves comprises forming the plurality of grooves such that at least some of the grooves extend into the second thermal insulating layer.

The method in accordance with any of the preceding clauses, wherein forming the plurality of grooves comprises forming the plurality of grooves such that at least some of the grooves extend through the second thermal insulating layer and at least partially into the first thermal insulating layer.

The method in accordance with any of the preceding clauses, wherein forming the plurality of grooves comprises forming the plurality of grooves such that at least some of the grooves extend through the second and first thermal insulating layers to contact the metallic bond coat layer.

The method in accordance with any of the preceding clauses, wherein depositing the material within the plurality of grooves further comprises depositing the material within the plurality of grooves to facilitate decreasing an amount of degradation of the component that is proximate to the line of extension of each of the plurality of grooves.

The method in accordance with any of the preceding clauses, wherein depositing the material within the plurality of grooves further comprises depositing the material to fill an entirety of each of the plurality of grooves.

The method in accordance with any of the preceding clauses, wherein depositing the material within the plurality of grooves further comprises depositing the material to fill only a portion of the plurality of grooves.

While the invention has been described in terms of various specific embodiments, those skilled in the art will recognize that the invention can be practiced with modification within the spirit and scope of the claims.

What is claimed is:

1. A method of forming a component, the method comprising:
    applying a thermal barrier coating to the component to facilitate decreasing heat transfer to the component, wherein the thermal barrier coating comprises:
        a metallic bond coat layer in contact with an outer surface of the component,
        a first thermal insulating layer extending across the metallic bond coat layer, and
        a second thermal insulating layer extending across at least a portion of the first thermal insulating layer;
    forming a plurality of grooves in at least one of the first thermal insulating layer or the second thermal insulating layer of the thermal barrier coating to facilitate increasing a strain tolerance of the thermal barrier coating,
    wherein each of the plurality of grooves extends a depth into the thermal barrier coating, and at least one of the plurality of grooves extends through the first thermal insulating layer and the second thermal insulating layer to a junction between the first thermal insulating layer and the metallic bond coat layer; and
    depositing a material within the plurality of grooves to facilitate increasing an amount of thermal protection of the metallic bond coat layer within those areas of the thermal barrier coating in which the plurality of grooves are formed.

2. The method of claim 1, wherein depositing the material within the plurality of grooves comprises depositing the material in a slurry form.

3. The method of claim 1, wherein depositing the material within the plurality of grooves comprises depositing the material in a spray form.

4. The method of claim 1, wherein forming the plurality of grooves comprises forming the plurality of grooves such that at least some of the grooves extend into the second thermal insulating layer.

5. The method of claim 1, wherein forming the plurality of grooves comprises forming the plurality of grooves such that at least some of the grooves extend through the second thermal insulating layer and at least partially into the first thermal insulating layer.

6. The method of claim 1, wherein depositing the material within the plurality of grooves further comprises depositing the material within the plurality of grooves to facilitate decreasing an amount of degradation of the component within those areas of the thermal barrier coating including the plurality of grooves.

7. The method of claim 1, wherein depositing the material within the plurality of grooves further comprises depositing the material to fill an entirety of each of the plurality of grooves.

8. The method of claim 1, wherein depositing the material within the plurality of grooves further comprises depositing the material to fill only a portion of the plurality of grooves.

9. The method of claim 1, wherein depositing the material within the plurality of grooves further comprises depositing the material within the plurality of grooves to facilitate decreasing an amount of oxidation of the component within those areas of the thermal barrier coating including the plurality of grooves.

10. The method of claim 1, wherein forming the plurality of grooves comprises forming each groove with a bottom surface that is defined by a radius.

11. A method of fabricating a turbine engine component, the method comprising:
    applying a thermal barrier coating to the component to facilitate decreasing heat transfer to the component, wherein the thermal barrier coating comprises at least one thermal insulating layer and a metallic bond coat layer, wherein the at least one thermal insulating layer extends across the metallic bond coat layer and defines an upper surface of the thermal barrier coating, and wherein the metallic bond coat layer is in contact with an outer surface of the component;

forming a plurality of grooves in the at least one thermal insulating layer of the applied thermal barrier coating to facilitate increasing a strain tolerance of the thermal barrier coating, wherein each of the plurality of grooves extends into a depth into the at least one thermal insulating layer to a groove bottom along a line perpendicular to the metallic bond coat layer; and depositing a material within the plurality of grooves to facilitate increasing an amount of thermal protection of the metallic bond coat layer that is proximate to the line of extension of each of the plurality of grooves, wherein the upper surface of the thermal barrier coating remains exposed in response to the material being deposited within the plurality of grooves.

12. The method of claim 11, wherein applying the thermal barrier coating to the component comprises applying a first thermal insulating layer across the component and a second thermal insulating layer across at least a portion of the first thermal insulating layer.

13. The method of claim 12, wherein forming the plurality of grooves comprises forming the plurality of grooves such that at least some of the grooves extend into the second thermal insulating layer.

14. The method of claim 12, wherein forming the plurality of grooves comprises forming the plurality of grooves such that at least some of the grooves extend through the second thermal insulating layer and at least partially into the first thermal insulating layer.

15. The method of claim 12, wherein forming the plurality of grooves comprises forming the plurality of grooves such that at least some of the grooves extend through the second and first thermal insulating layers to contact the metallic bond coat layer.

16. The method of claim 15, wherein depositing the material within the plurality of grooves further comprises depositing the material within the plurality of grooves to facilitate decreasing an amount of degradation of the component that is proximate to the line of extension of each of the plurality of grooves.

17. The method of claim 11, wherein depositing the material within the plurality of grooves further comprises depositing the material to fill an entirety of each of the plurality of grooves.

18. The method of claim 11, wherein depositing the material within the plurality of grooves further comprises depositing the material to fill only a portion of the plurality of grooves.

19. The method of claim 1, wherein the second thermal insulating layer defines an upper surface of the thermal barrier coating, the upper surface of the thermal barrier coating remaining exposed in response to the material being deposited within the plurality of grooves.

* * * * *